(12) United States Patent
Hamamoto

(10) Patent No.: US 10,831,426 B2
(45) Date of Patent: Nov. 10, 2020

(54) IMAGE FORMING APPARATUS

(71) Applicant: TOSHIBA TEC KABUSHIKI KAISHA, Tokyo (JP)

(72) Inventor: Kiyoshiro Hamamoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/578,143

(22) Filed: Sep. 20, 2019

(65) Prior Publication Data

US 2020/0012469 A1 Jan. 9, 2020

Related U.S. Application Data

(63) Continuation of application No. 16/101,210, filed on Aug. 10, 2018, now abandoned.

(30) Foreign Application Priority Data

Sep. 27, 2017 (JP) .................................. 2017-185988

(51) Int. Cl.
*G06F 3/12* (2006.01)
*H04N 1/00* (2006.01)
(52) U.S. Cl.
CPC .......... *G06F 3/1291* (2013.01); *G06F 3/1205* (2013.01); *G06F 3/1207* (2013.01); *G06F 3/1241* (2013.01); *G06F 3/1254* (2013.01); *G06F 3/1255* (2013.01); *G06F 3/1257* (2013.01); *G06F 3/1273* (2013.01); *H04N 1/0097* (2013.01); *H04N 1/00347* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| 8,514,436 B2 | 8/2013 | Igarashi et al. |
| 9,135,528 B2 | 9/2015 | Minagawa |
| 2010/0271661 A1* | 10/2010 | Ogino .................... G06F 3/1205 358/1.15 |
| 2011/0170128 A1* | 7/2011 | Takahashi ............. G06F 3/1267 358/1.13 |

(Continued)

FOREIGN PATENT DOCUMENTS

| EP | 1191433 A1 | 3/2002 |
| JP | 2010-287216 A | 12/2010 |

OTHER PUBLICATIONS

Extended European Search Report dated Dec. 11, 2018 in corresponding European Patent Application No. 18195949.5, 7 pages.

*Primary Examiner* — Frantz Bataille
(74) *Attorney, Agent, or Firm* — Kim & Stewart LLP

(57) ABSTRACT

An image forming apparatus includes a storage unit and a processor. The storage unit stores job parameters shared by a group of image forming apparatuses. The processor determines a job parameter among one of the shared job parameters that cannot be executed by the image forming apparatus and adjusts a set value of the job parameter so that the job parameter can be executed by the image forming apparatus.

20 Claims, 7 Drawing Sheets

(56) References Cited

U.S. PATENT DOCUMENTS

2011/0205558 A1* 8/2011 Nakajima ............. G06F 3/1205
                                                    358/1.2
2012/0120439 A1* 5/2012 Minagawa ............ G06F 3/1288
                                                    358/1.15

* cited by examiner

FIG. 2

JOB HISTORY

SELECT JOB PARAMETER TO BE SHARED

| PRINT | 2017/03/10  11:00 | DETAILS |
| FAX | 2017/03/09  14:30 | DETAILS |
| SCAN | 2017/03/08  12:25 | DETAILS |

JOB PARAMETER

SCAN

| COLOR MODE | BLACK-AND-WHITE | IMAGE ROTATION | 0 |
| RESOLUTION | 600dpi | DOCUMENT SIZE | AUTOMATIC |
| DOCUMENT MODE | TEXT/PICTURE | FILE FORMAT | PDF |
| DUPLEX MODE | SIMPLEX | FILE NAME | test |

BACK

FIG. 7

SHARED JOB PARAMETER LIST

CORRECTION IS PERFORMED DUE TO MISMATCH BETWEEN SHARED JOB PARAMETERS.

| COPY | 2017/03/9  09:00 | DETAILS — 941 |
|---|---|---|
| SCAN | 2017/03/08  20:30 | DETAILS — 941 |
| SCAN | 2017/03/08  12:25 | DETAILS — 941 |

JOB PARAMETER

AUTOMATIC CORRECTION: COLOR MODE     MANUAL CORRECTION: RESOLUTION

SCAN

| COLOR MODE | BLACK-AND-WHITE | IMAGE ROTATION | 0 |
|---|---|---|---|
| RESOLUTION | 400dpi | DOCUMENT SIZE | AUTOMATIC |
| DOCUMENT MODE | TEXT/PICTURE | FILE FORMAT | PDF |
| DUPLEX MODE | SIMPLEX | FILE NAME | Xxx |

MANUAL CORRECTION — 951     BACK — 952

95

IMAGE FORMING APPARATUS

CROSS-REFERENCE TO RELATED APPLICATION

This application is a continuation of U.S. patent application Ser. No. 16/101,210, filed Aug. 10, 2018, which application is based upon and claims the benefit of priority from Japanese Patent Application No. 2017-185988, filed Sep. 27, 2017, the entire contents of which are incorporated herein by reference.

FIELD

Embodiments described herein relate generally to a technique of sharing job parameters in an image forming apparatus.

BACKGROUND

In an image forming apparatus of the related art, job parameters of a job selected from job history may be registered. In such image forming apparatus, selection of a registered job parameter is received on a predetermined screen, and job parameters are called in response thereto. The image forming apparatus inserts a file of a registered job parameter into a sharing file, as a result of which any image forming apparatus in a network can retrieve the registered job parameters so that the job parameters can be used for executing a job.

However, respective image forming apparatuses in a network have different capabilities. Thus, in the related art, if a shared job parameter is used, there is concern that a job may not be normally executed depending on the capabilities of the image forming apparatuses in the network. For example, if shared job parameters are related to stapling, in an image forming apparatus having no stapling function, there is concern that the job may not be properly executed when using the shared job parameters.

DESCRIPTION OF THE DRAWINGS

FIG. 2 is a diagram illustrating a screen for sharing job parameters.

FIG. 3 is a diagram illustrating a screen on which job parameters are displayed.

FIG. 7 is a diagram illustrating a screen for notifying automatic correction of a shared job parameter.

FIG. 8 is a diagram illustrating a screen on which job parameters are displayed.

DETAILED DESCRIPTION

Embodiments provide a technique for normally using shared job parameters.

According to an exemplary embodiment, there is provided an image forming apparatus including a storage unit and a processor. The storage unit stores job parameters shared by a group of image forming apparatuses. The processor determines a job parameter among one of the shared job parameters that cannot be executed by the image forming apparatus and adjusts a set value of the job parameter so that the job parameter can be executed by the image forming apparatus.

Hereinafter, embodiments will be described with reference to the drawings.

Figure 1:
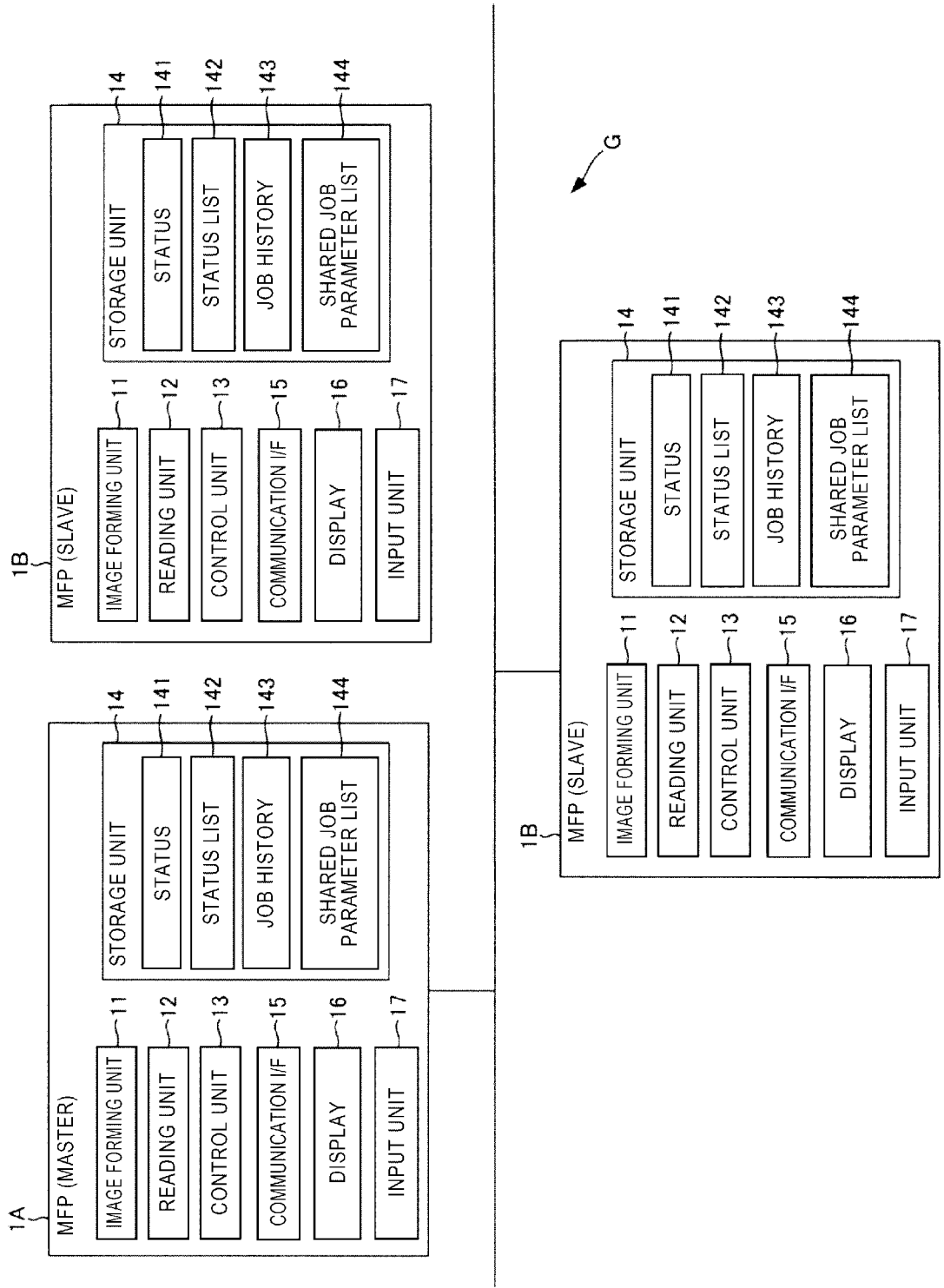
FIG. 1 is a diagram illustrating a group of networked MFPs.

FIG. 1 is a diagram illustrating multi-function peripherals (MFPs) 1A and 1B, which are more generally referred to herein as image forming apparatuses.

The MFPs 1A and 1B may execute a plurality of process functions such as printing, copying, scanning, and faxing. The MFPs 1A and 1B are connected to the Internet and included in a group G including a plurality of MFPs 1A and 1B. The MFPs 1A and 1B are connected to each other in a wired or wireless manner. In the group G, the MFPs 1A and 1B may share job parameters of an executed job. Regarding a job parameter sharing function in the group G, the MFP 1A is a higher-rank master, and other MFPs 1B are lower-rank slaves of the MFP 1A.

IP addresses of MFPs 1B forming the group G are set in the MFP 1A in advance, and the MFP 1A notifies MFPs 1B of information indicating that the MFP 1A is a master and an IP address of the MFP 1A. Consequently, synchronization of a status list 142 or a shared job parameter list 144, which will be described later, becomes possible for the MFPs 1A and 1B of the group G via the MFP 1A. An intranet includes a personal computer (PC) (not illustrated) in addition to the MFPs 1A and 1B.

Each of the MFPs 1A and 1B includes an image forming unit 11, a reading unit 12, a control unit 13, a storage unit 14, a communication interface (I/F) 15, a display 16, and an input unit 17.

The image forming unit 11 forms an image on a sheet. The image forming unit 11 forms a latent image on a photoconductor with laser light, and develops the latent image with toner so as to form a toner image on the photoconductor. The image forming unit 11 transfers the toner image on the photoconductor onto a sheet, and heats the sheet by a fixing device so as to fix the toner image to the sheet. Alternatively, the image forming unit 11 may form an image on a sheet by ejecting ink from a head. Each of the MFPs 1A and 1B may perform a printing process of forming an image on a sheet on the basis of image data received from the PC in the intranet by using the image forming unit 11.

The reading unit 12 includes an imaging element such as a charge coupled device (CCD). Each of the MFPs 1A and 1B may perform a scanning process of generating image data by reading a sheet on a platen using the reading unit 12. The MFPs 1A and 1B may perform a faxing process of faxing the read image data, or a copying process of forming an image on a sheet on the basis of the read image data.

The control unit 13 includes a processor, and controls the MFP. The control unit 13 reads a program in the storage unit 14 so as to perform various processes.

The storage unit 14 is a memory, and stores various threshold values or programs. The storage unit 14 stores a status 141, the status list 142, job history 143, and the shared job parameter list 144. The status 141 includes identification information such as a printer name, an IP address, or a MAC address, and a capability of the MFP. The capability of the MFP indicates, for example, the color mode (e.g., full color mode in which printing using a plurality of colors can be performed and black-and-white mode in which printing using only black can be performed), a range of a resolution, the printing mode (e.g., duplex printing mode and simplex printing mode), whether or not stapling or punching can be performed, and a sheet size of each cassette.

Figure 6:
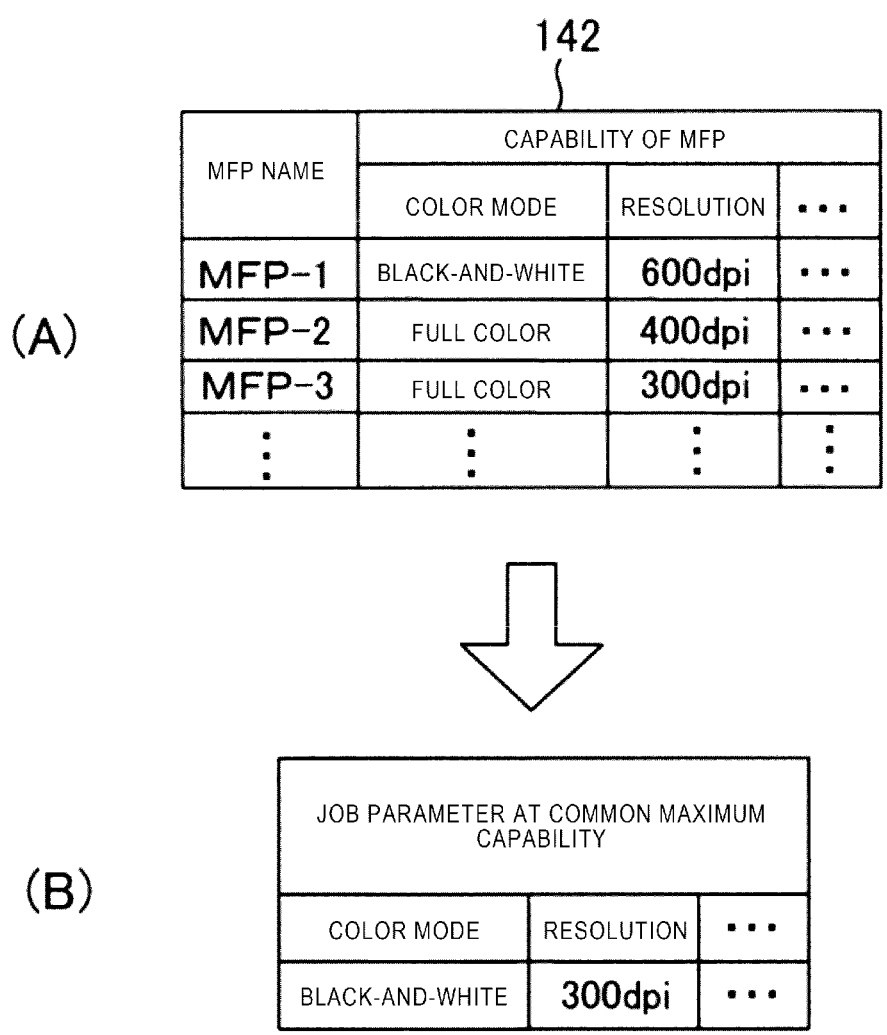
FIG. 6 is a diagram for explaining a method of calculating a common maximum capability.

The status list 142 is a list of statuses of the MFPs 1A and 1B included in the group G (refer to FIG. 6). The status list 142 is updated to be in synchronization across the MFPs 1A and 1B. The update is performed periodically, at a timing at which the MFPs 1A and 1B forming the group G are changed, or at a timing at which a capability of any of the MFPs 1A and 1B is changed.

The job history 143 is history of jobs performed by the MFPs 1A and 1B, such as copying, printing, scanning, and faxing. Each job in the job history 143 is stored in correlation with identification information of the MFPs 1A and 1B, the execution date and time of the job, and job parameters.

As illustrated in FIG. 3, for example, if a job is scanning, items of set values of the job parameters are a color mode, a resolution, a document mode (e.g., text mode, text/picture mode, and picture mode), a printing mode (e.g., duplex printing mode and simplex printing mode), image rotation (rotation angle in editing of image data), a document size (designated size of a processed sheet or automatic determination for a processed sheet size), a file format (file format of stored image data), and a file name (file name of the stored image data).

The shared job parameter list 144 is a list of shared job parameters shared by the MFPs 1A and 1B of the group G.

The communication I/F 15 is an interface used for the MFPs 1A and 1B to perform communication with external terminals.

The display 16 is a touch panel or the like, and displays setting information or operation statuses of the MFPs 1A and 1B, log information, and notification to a user.

The input unit 17 is a touch panel or a physical key, and receives a user's input. The input unit 17 receives an instruction for a functional operation of the MFPs 1A and 1B such as an instruction for printing, or input of settings.

FIG. 2 is a diagram illustrating a screen 91 for sharing job parameters. Hereinafter, a description will be made of processes in the MFPs 1A and 1B if job parameters are shared by the slave MFP 1B.

If an instruction for displaying the job history 143 is received from a user, the MFP 1B displays the screen 91 on which respective jobs of the job history 143 are displayed in a list form, on the display 16. Each job is displayed with the type of job and the execution date and time of the job. A details button 911 is also displayed.

If selection of a job is received (in the example illustrated in FIG. 2, a scan job at the lowermost part is selected), and selection of the details button 911 is received, the MFP 1B displays job parameters of the job as illustrated in FIG. 3. Referring to FIG. 2 again, if selection of the job is received, and selection of an OK button 912 is received, the MFP 1B shares the job parameters of the job with the MFPs 1A and 1B of the group G. Specifically, the MFP 1B transmits the shared job parameters (including the type of job and the execution date and time of the job) which are parameters of the job shared in the group G, to the master MFP 1A.

Then, the MFP 1A updates the shared job parameter list 144, and adds the new shared job parameters to the shared job parameter list 144. The MFP 1A notifies the slave MFPs 1B of the update of the shared job parameter list 144. Consequently, each MFP 1B synchronizes the shared job parameter list 144 stored therein with the shared job parameter list 144 of the master MFP 1A so as to update the shared job parameter list 144 stored therein.

If selection of a job of which job parameters are shared from the job history 143 is received, the master MFP 1A updates the shared job parameter list 144 stored therein, and notifies the slave MFPs 1B of the update. Consequently, each MFP 1B synchronizes the shared job parameter list 144 stored therein with the shared job parameter list 144 of the master MFP 1A.

Figure 4:
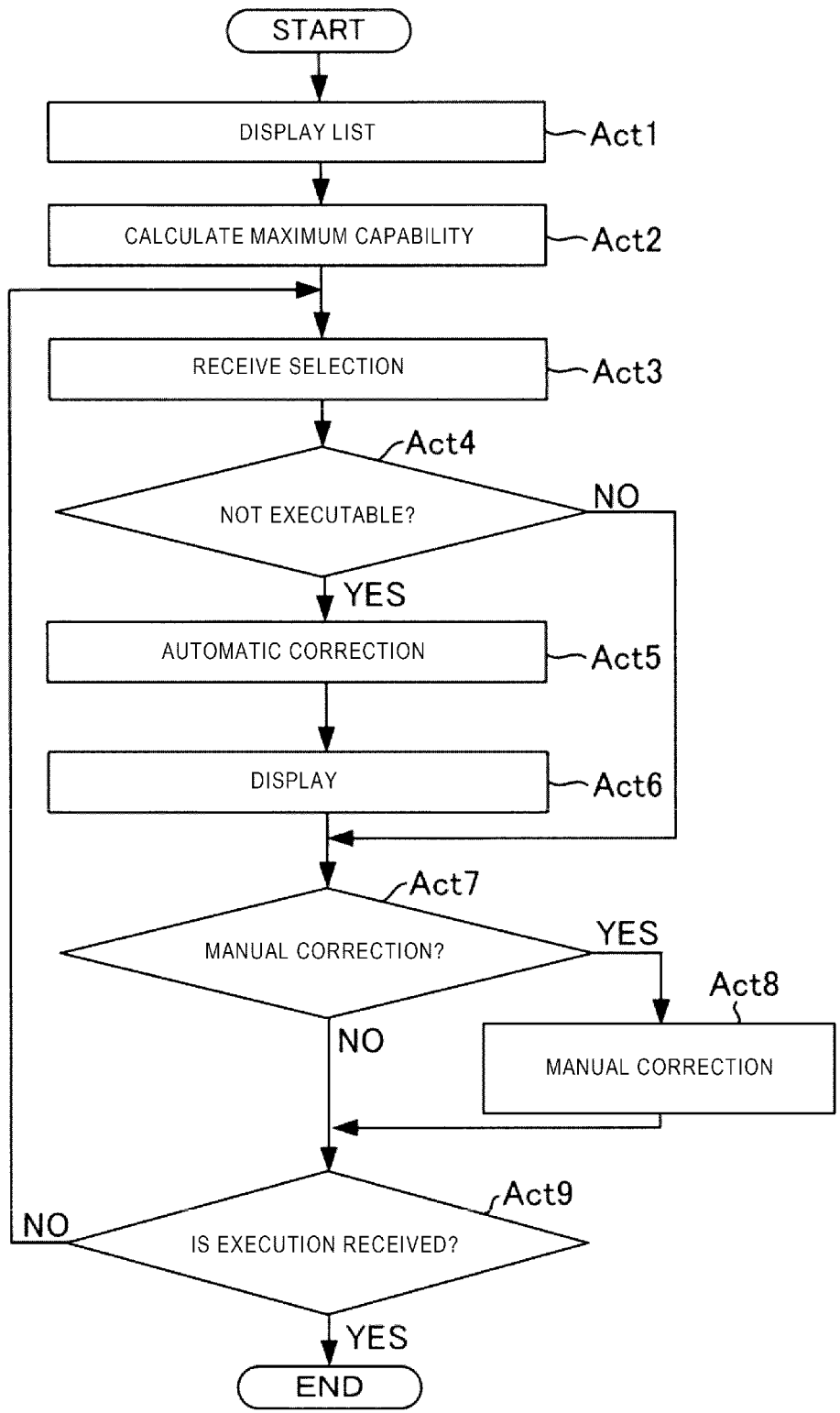
FIG. 4 is a flowchart illustrating a process in an MFP if shared job parameters are used.

Hereinafter, with reference to a flowchart of FIG. 4, a description will be made of processes in the MFPs 1A and 1B if shared job parameters are used.

Figure 5:
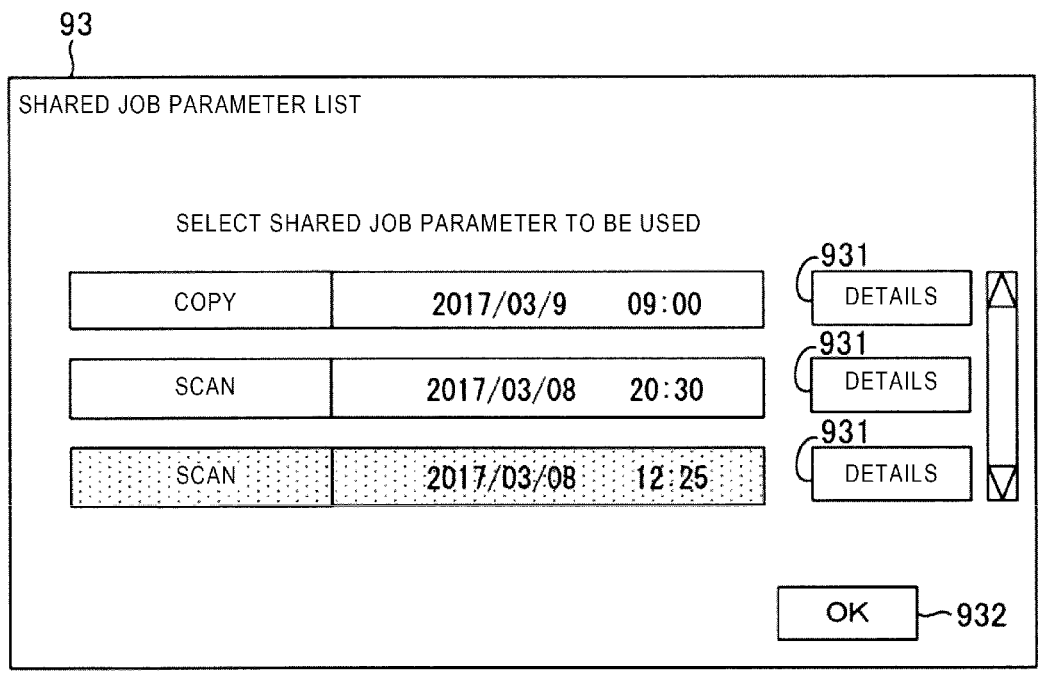
FIG. 5 is a diagram illustrating a screen on which a shared job parameter list is displayed.

If an instruction for displaying the shared job parameter list 144 is received from the user, the MFP (e.g., one of the MFPs 1A and 1B) displays a screen 93 on which shared job parameters of the shared job parameter list 144 are displayed in a list form, on the display 16 as illustrated in FIG. 5 (Act 1). The respective shared job parameters are displayed along with the type of job related to the shared job parameters and the execution date and time of the job. A details button 931 is displayed. If selection of the details button 931 is received, the MFP displays set values of the respective shared job parameters as illustrated in FIG. 3 described above.

FIG. 6 is a diagram for explaining a method of calculating a common maximum capability. In FIG. 6, (A) depicts a diagram illustrating the status list 142, and (B) depicts a diagram illustrating a set value of each item of a calculated common maximum capability.

The MFP calculates a common maximum capability which is the lowest capability among capabilities for the respective items of the MFPs 1A and 1B included in the group G on the basis of the status list 142 (Act 2). In the MFPs 1A and 1B of the group G, capabilities for a color mode include black-and-white mode capability and full color mode capability. The MFPs 1A and 1B which can form an image in a full color mode can form an image in a black-and-white mode, and thus the full color mode is a higher rank than the black-and-white mode. Therefore, in the item of the color mode, a common maximum capability which is the lowest capability in the group G is the black-and-white mode as depicted in (B) of FIG. 6. The MFPs 1A and 1B of the group G have resolutions such as 600 dpi, 400 dpi, and 300 dpi. Therefore, as for the resolution, a common maximum capability is 300 dpi.

Referring to FIG. 5 again, if shared job parameters to be used are selected, and an OK button 932 is pressed, the MFP receives the selection of the shared job parameters to be used (Act 3). In the example illustrated in FIG. 5, the shared job parameters related to the scan job at the lowermost part are selected.

The MFP determines whether or not all of the respective items of the selected shared job parameters can be executed with the capability thereof (Act 4). If all of the items of the shared job parameters are determined to be executable (Act 4: NO), the MFP performs a process in Act 7 which will be described later.

If there is a shared job parameter among items of the selected shared job parameters which cannot be executed by the FMP with the capability thereof, for example, if a color mode as a selected shared job parameter is a full color mode, and a capability for a color mode of the MFP is a black-and-white mode, the MFP determines that the shared job parameter cannot be executed (Act 4: YES).

In this case, the MFP corrects a set value of an item which cannot be executed, to a job parameter which can be executed, that is, to a common maximum capability (Act 5). For example, if a color mode of a selected shared job parameter is a full color mode, and the capability for a color mode of the MFP is a black-and-white mode, the full color mode which is a color mode of the shared job parameter cannot be executed by the MFP. In this case, the MFP corrects a color mode of the shared job parameter to the black-and-white mode which is a common maximum capability (refer to (B) in FIG. 6) from the full color mode.

As another example, if a resolution of a selected shared job parameter is 900 dpi, and an upper limit of a capability for a resolution of the MFP is 600 dpi, a scan job cannot be executed by the MFP in the resolution "900 dpi" of the shared job parameter. In this case, the MFP corrects the resolution of the shared job parameter from 900 dpi to 300 dpi (refer to (B) in FIG. 6) which is a common maximum capability.

Herein, the MFP is assumed to correct a color mode of a shared job parameter to the black-and-white mode from the full color mode.

FIG. 7 is a diagram illustrating a screen 94 for notifying automatic correction of a shared job parameter.

The MFP displays information indicating that a selected shared job parameter cannot be performed with the capability thereof, and thus the shared job parameter is automatically corrected on a screen 94 (Act 6).

FIG. 8 is a diagram illustrating a screen 95 on which job parameters are displayed.

If selection of a details button 941 for selected shared job parameters is received on the screen 94 in FIG. 7, the MFP displays the screen 95 on which a corrected set value for each item of selected shared job parameters is displayed in FIG. 8. In this example, since a color mode is corrected to the black-and-white mode from the full color mode, an item of a shared job parameter automatically corrected is displayed on the screen 95.

Figures 9, 10:
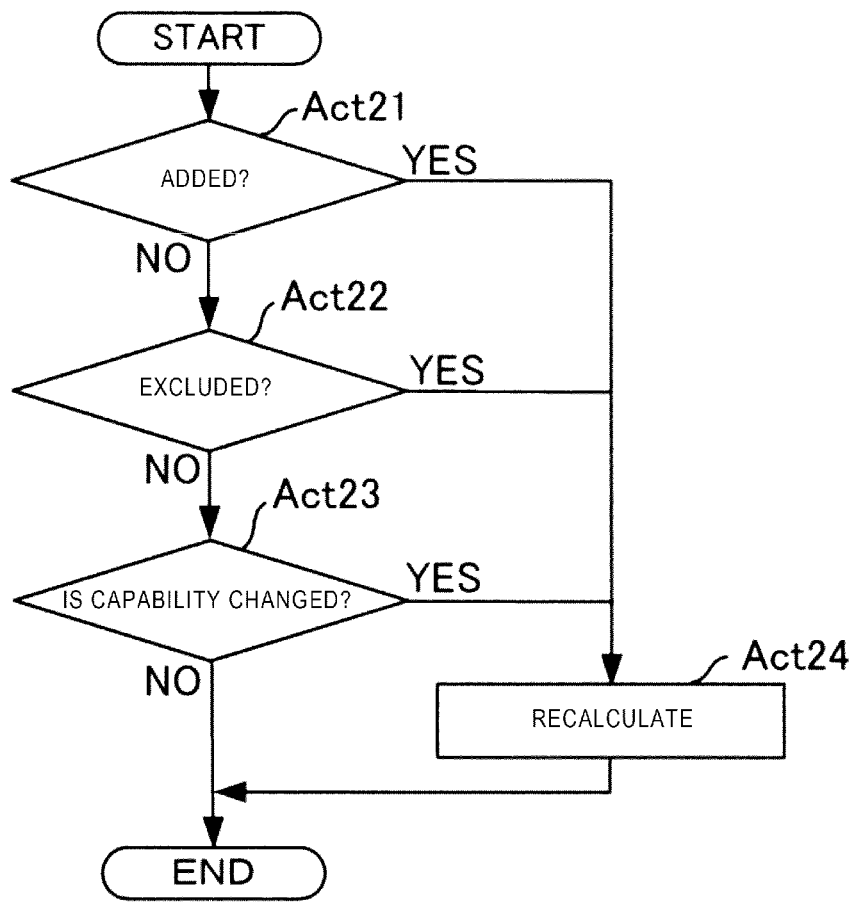
FIG. 9 is a diagram illustrating a screen for performing manual correction.
FIG. 10 is a flowchart illustrating a flow of a process of performing recalculation of a common maximum capability.

FIG. 9 is a diagram illustrating a screen 96 for performing manual correction.

If any item of a shared job parameter is selected on the screen 95 in FIG. 8, and selection of a manual correction button 951 is received, the MFP displays the screen 96 in FIG. 9 for performing manual correction. Herein, an item of a resolution is assumed to be selected as a shared job parameter.

In the selected item of the shared job parameter, not only a plurality of set values which can be executed with the capability of the MFP but also the current set value is displayed on the screen 96. Herein, the current set value is assumed to be 300 dpi, and 600, 400, 300, 200, 150, and 100 (dpi) are displayed as set values of selectable resolutions. If a set value is selected and a determination button 961 is selected on the screen 96, the MFP corrects the set value to the selected set value.

The MFP displays the manually corrected item on the screen 95 in FIG. 8 (Act 7: YES, and Act 8). Herein, a case is assumed in which 400 dpi is selected on the screen 96, the submit button 961 is selected, and thus the MFP corrects a set value of the resolution of the shared job parameter from 300 dpi to 400 dpi. The MFP is assumed to display the manually corrected item as a resolution on the screen 95 in FIG. 8 (Act 7: YES, and Act 8). If manual correction is not performed (Act 7: NO), the MFP performs the next process in Act 9.

If a back button 952 is selected on the screen 95, the MFP displays the screen 94 in FIG. 7. If selection of a shared job parameter is received, and selection of the OK button 932 or 942 is received, on the screen 94 in FIG. 7 or the screen 93 in FIG. 5, the MFP fixes the content of the shared job parameter to be used (Act 9: YES), and finishes the process.

Consequently, the MFP can execute a job at a set value of the shared job parameter of which selection is received.

For example, as in this example, if the shared job parameters of the scan job are selected, and the OK button 932 or 942 is selected, the MFP executes the scan job with the selected shared job parameters of the scan job. In other words, the MFP reads a sheet on a platen according to a set value of a shared job parameter such as 400 dpi by using the reading unit 12, generates image data in a pdf form, and sets Xxx as a file name. If another shared job parameter is selected without selecting the OK button 932 or 942 on the screen 94 in FIG. 7 or the screen 93 in FIG. 5, the MFP performs the process in Act 3 again (Act 9: NO, and Act 3).

FIG. 10 is a flowchart illustrating a flow of a process in the MFP 1A which recalculates a common maximum capability.

The master MFP 1A is not necessarily required to calculate a common maximum capability at a timing of receiving an instruction for displaying the shared job parameter list 144, and may calculate a common maximum capability at an appropriate timing, and may synchronize a calculation result with other MFPs 1B. In other words, if a new MFP 1B is added to the group G (Act 21: YES), a certain MFP 1B is excluded from the group G (Act 22: YES), or a capability of any of the MFPs 1A and 1B of the group G is changed (Act 23: YES), the MFP 1A may recalculate a common maximum capability. The MFP 1A may synchronize the recalculated common maximum capability with other MFPs 1B (Act 24). If a configuration of the MFP 1B of the group G is not changed (Act 21: NO, and Act 22: NO), and the capabilities of the MFPs 1A and 1B of the group G are not changed (Act 23: NO), and after Act 24, the MFP 1A finishes the process.

MODIFICATION EXAMPLES

If a shared job parameter cannot be executed with the capability of an MFP (e.g., one of the MFPs 1A and 1B), the MFP may correct a set value of the shared job parameter to a set value at which the job parameter can be executed with the maximum capability thereof. For example, a case is assumed in which the maximum resolution at which the MFPs 1A and 1B can perform scanning is 600 dpi, and a common maximum capability which is the lowest capability among capabilities of resolutions of the image forming apparatuses 1A and 1B included in the group G is 300 dpi. In this case, if a resolution of a shared job parameter is 900 dpi, the resolution may not be corrected to 300 dpi which is a common maximum capability unlike in the exemplary embodiment, and may be corrected to 600 dpi which is the maximum capability of a resolution of the own apparatus.

As described above, according to the technique disclosed in the present specification, the technique for normally using a shared job parameter can be provided.

What is claimed is:

1. An image forming apparatus comprising:
a display;
a memory that stores a plurality of sets of job parameters, each set having been used by one of a plurality of image forming apparatuses in a group to perform one of jobs; and
a processor configured to
generate a first screen to be displayed on the display, indicating a list of the jobs,
upon selection of one of the jobs via the first screen, determine a job parameter among the job parameters that has been used to perform the selected job and cannot be used by the image forming apparatus, adjust the determined job parameter so that the job parameter can be used by the image forming apparatus, and perform the selected job using the adjusted job parameter.

2. The apparatus according to claim 1, wherein the image forming apparatus is one of a plurality of slave image forming apparatuses in the group.

3. The apparatus according to claim 1, wherein the image forming apparatus is a master image forming apparatus in the group.

4. The apparatus according to claim 3, wherein the processor is further configured to, upon receipt of the plurality of sets of job parameters that have been used by one of a plurality of image forming apparatuses in the group via a network interface, adjust each of the job parameters so that the job parameter can be executed by any one of the image forming apparatuses in the group.

5. The apparatus according to claim 4, wherein the processor adjusts each of the job parameters so that the job parameter can be executed by one of the image forming apparatuses having a lowest printing capability in the group.

6. The apparatus according to claim 4, wherein the processor is configured to
adjust each of the job parameters each time a new image forming apparatus is added to the group or one of the image forming apparatuses is removed from the group, and
perform a synchronization of the adjusted job parameters with the image forming apparatuses in the group.

7. The apparatus according to claim 4, wherein the processor is configured to
adjust each of the job parameters each time a printing capability of one of the image forming apparatuses in the group is changed, and
perform a synchronization of the adjusted job parameters with the image forming apparatuses in the group.

8. The apparatus according to claim 1, wherein the processor is further configured to generate a second screen to be displayed on the display and by which the adjusted parameter can be further adjusted manually.

9. The apparatus according to claim 1, wherein the processor is further configured to generate third and fourth screens to be displayed on the display,
the third screen showing the adjusted parameter, and
the fourth screen by which an input for modifying the parameter is received.

10. An image forming system comprising:
a master image forming apparatus;
a plurality of slave image forming apparatuses connected to the master image forming apparatus and to each other over a network, wherein
a first image forming apparatus of a group of image forming apparatuses, which includes the master image forming apparatus and the slave image forming apparatuses, comprises
a display,
a memory that stores a plurality of sets of job parameters, each set having been used by one of a plurality of image forming apparatuses in a group to perform one of jobs, and
a processor configured to generate a first screen to be displayed on the display, indicating a list of the jobs;
upon selection of one of the jobs via the first screen, determine a job parameter among the job parameters that has been used to perform the selected job and cannot be used by the first image forming apparatus,
adjust the determined job parameter so that the job parameter can be used by the first image forming apparatus, and
perform the selected job using the adjusted job parameter.

11. The system according to claim 10, wherein the first image forming apparatus is one of the slave image forming apparatuses in the group.

12. The system according to claim 10, wherein the image forming apparatus is the master image forming apparatus in the group.

13. The system according to claim 12, wherein the processor is further configured to, upon receipt of the plurality of sets of job parameters that have been used by one of the image forming apparatuses in the group via a network interface, adjust each of the job parameters so that the job parameter can be executed by any one of the image forming apparatuses in the group.

14. The system according to claim 13, wherein the processor adjusts each of the job parameters so that the job parameter can be executed by one of the image forming apparatuses having a lowest printing capability in the group.

15. The system according to claim 13, wherein the processor is configured to
adjust each of the job parameters each time a new image forming apparatus is added to the group or one of the image forming apparatuses is removed from the group, and
perform a synchronization of the adjusted job parameters with the image forming apparatuses in the group.

16. The system according to claim 13, wherein the processor is configured to
adjust each of the job parameters each time a printing capability of one of the image forming apparatuses in the group is changed, and
perform a synchronization of the adjusted job parameters with the image forming apparatuses in the group.

17. The system according to claim 10, wherein the processor is further configured to generate a second screen to be displayed on the display and by which the adjusted parameter can be further adjusted manually.

18. The system according to claim 10, wherein the processor is further configured to generate third and fourth screens to be displayed on the display,
the third screen showing the adjusted parameter, and
the fourth screen by which an input for modifying the parameter is received.

19. A method of sharing job parameters among a group of image forming apparatuses connected to each other over a network, the method comprising:
storing by one of the image forming apparatuses in the group a plurality of sets of job parameters, each set having been executed by another image forming apparatus in the group to perform one of jobs;
displaying a first screen indicating a list of the jobs;
upon selection of one of the jobs via the first screen, determining, by said one of the image forming apparatuses, a job parameter among the job parameters that has been used to perform the selected job and cannot be executed thereby and adjusting the determined job parameter so that the job parameter can be executed thereby; and performing the selected job using the adjusted job parameter.

20. The method according to claim 19, further comprising:

adjusting each of the job parameters so that the job parameter can be executed by any one of the image forming apparatuses in the group.

* * * * *